United States Patent [19]

Koshkarian et al.

[11] Patent Number: 5,578,349
[45] Date of Patent: Nov. 26, 1996

[54] PROCESS FOR COATING A CERAMIC GLOW PLUG PORTION WITH A CORROSION INHIBITING MATERIAL

[75] Inventors: Kent A. Koshkarian; Chuong Q. Dam, both of Peoria; M. Brad Beardsley, Laura, all of Ill.

[73] Assignee: Caterpillar Inc., Peoria, Ill.

[21] Appl. No.: 565,372

[22] Filed: Nov. 30, 1995

[51] Int. Cl.$^6$ .................................................. C23C 4/10
[52] U.S. Cl. ...................... 427/453; 427/299; 427/309; 123/145 A; 219/270; 219/553
[58] Field of Search ...................... 123/145 A; 219/270, 219/553; 427/453, 309, 299

[56] References Cited

U.S. PATENT DOCUMENTS

| | | | |
|---|---|---|---|
| 3,941,903 | 3/1976 | Tucker, Jr. | 427/453 |
| 4,786,781 | 11/1988 | Nozaki et al. | 123/145 A |
| 5,084,606 | 1/1992 | Bailey et al. | 123/145 A |
| 5,304,778 | 4/1994 | Dasgupta et al. | 123/145 A |

Primary Examiner—Katherine Bareford
Attorney, Agent, or Firm—Pankaj M. Khosla

[57] ABSTRACT

A process for applying a uniformly adherent protective tantalum oxide coating on a portion of a ceramic glow plug for protecting the glow plug against the corrosive/erosive environment generated by the burning of alternative fuels in a diesel engine. The coating is tantalum oxide deposited on a silicon nitride glow plug by plasma spray deposition techniques.

23 Claims, 2 Drawing Sheets

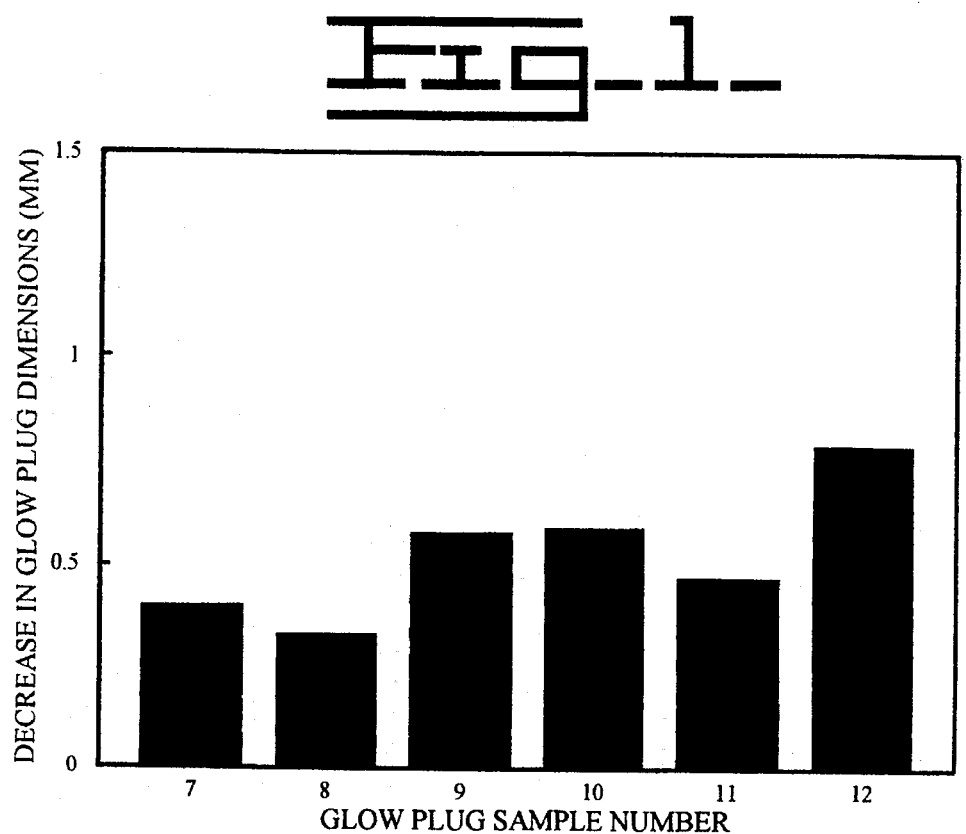
Fig_1_
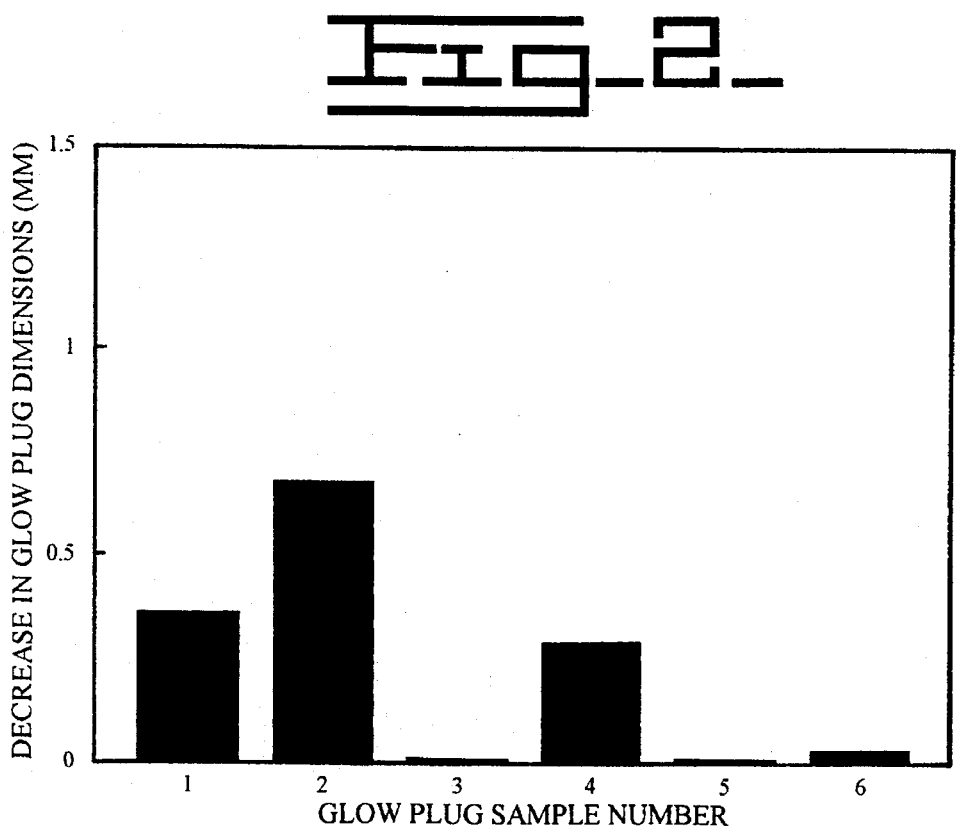
Fig_2_

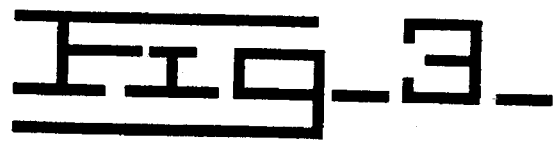
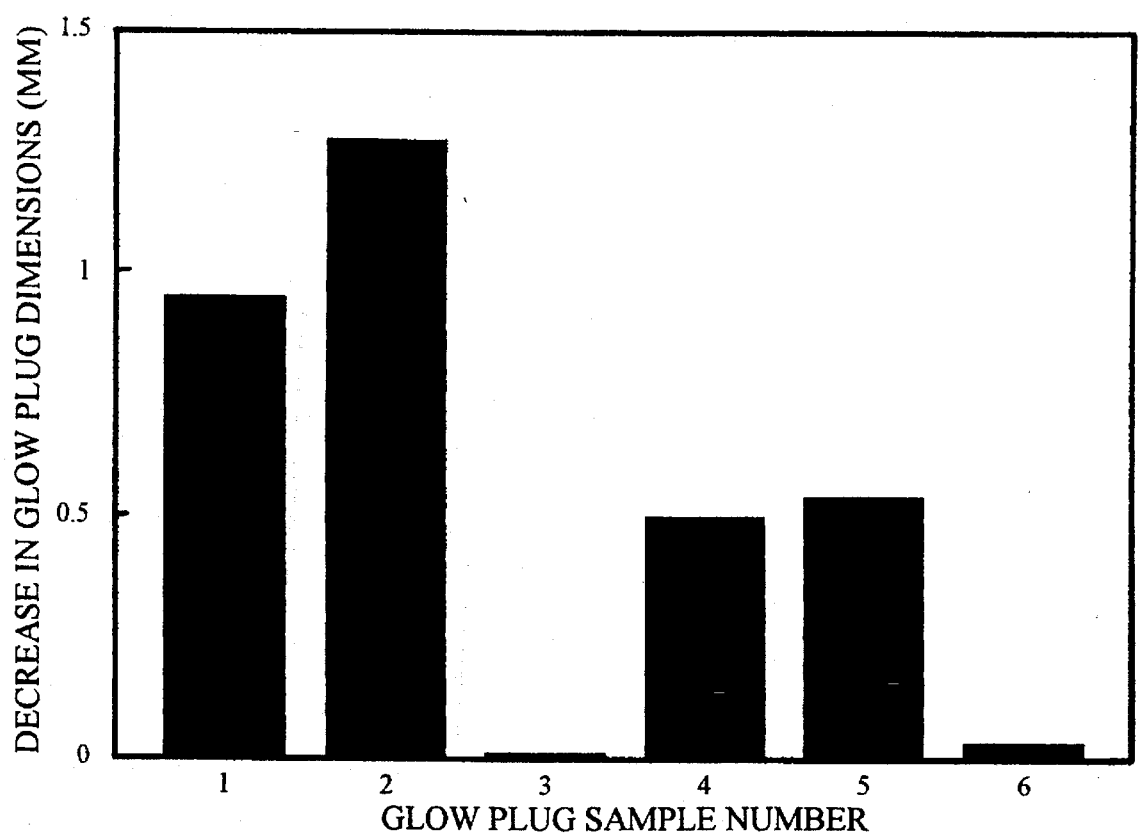

PROCESS FOR COATING A CERAMIC GLOW PLUG PORTION WITH A CORROSION INHIBITING MATERIAL

TECHNICAL FIELD

The present invention relates to a process for coating a ceramic glow plug portion with a corrosion inhibiting material and more particularly, to a process for coating a silicon nitride glow plug with tantalum oxide.

BACKGROUND ART

In the operation of diesel engines that are adapted for utilizing alternative fuels, the use of a glow plug to beneficially assist the ignition of the non-autoignitable fuel during start-up as well as during operation is well known. It is also well known that such glow plugs have a less than desirable service life owing to the harsh environment in the combustion chamber due to elevated temperatures. Particularly, where the glow plug is formed of a ceramic material, such as silicon nitride, the service life of the glow plug is further reduced due to thermal stresses, oxidation and corrosion. The operating longevity of a silicon nitride glow plug is further compromised when it is utilized in a diesel engine that is burning fuel other than diesel fuel.

When a silicon nitride glow plug is utilized to assist in the ignition of non-autoignitable fuels, at the elevated temperatures needed to sustain fuel combustion, the silicon nitride undergoes severe corrosion and erosion due in part to the presence of impurities such as sodium, calcium, magnesium and sulfur introduced by the fuel and the lubrication oil. At Thigh temperatures, these impurities react with the normally stable $SiO_2$ layer on the silicon nitride surface to form compounds such as $Na_2SO_4$ having a lower melting temperature than silicon nitride, which are progressively eroded away by fuel and air spray.

It is desirable to provide the surface of a ceramic glow plug with a protective coating that is not attacked by the impurities in the combustion environment and thus inhibits the corrosion and/or erosion mechanism. It is also desirable that the protective coating have very good adhesion to the glow plug surface. It is further desirable that the protective coating have uniform continuity across the surface of the glow plug to provide uniform corrosion and erosion protection.

To solve the problems described above, this invention resides in a process for coating preselected portions of a silicon nitride glow plug with a corrosion and erosion inhibiting material such as tantalum oxide, which has a compatible coefficient of thermal expansion as silicon nitride. The process embodied in the invention results in very good adhesion of tantalum oxide to the silicon nitride surface of the glow plug. The process embodied in the invention also results in good continuity of tantalum oxide across the surface of silicon nitride, resulting in uniform corrosion inhibiting characteristics. The tantalum oxide coating deposited by the process of the present invention desirably seals the glow plug from the detrimental environment generated by the use of alternative fuels. The present invention is directed to overcome one or more of the problems as set forth above.

DISCLOSURE OF THE INVENTION

In one aspect of the invention, a process is provided for coating at least a portion of a ceramic glow plug with a corrosion inhibiting material. In the process, a preselected portion of the glow plug is first cleaned and then etched. The glow plug is then placed on a device rotatable at a preselected speed. The glow plug portion to be coated, and a plasma spray gun, are positioned at relative positions adjacent one another. A primary gas is provided to the plasma spray gun at a pressure sufficient to deliver the primary gas at a flow rate in the range of about 60 $ft^3$/hr to about 120 $ft^3$/hr. A secondary gas is provided to the plasma spray gun at a pressure sufficient to deliver the secondary gas at a flow rate in the range of about 5 $ft^3$/hr to about 30 $ft^3$/hr. A power source is adjusted to deliver current in the range of about 400 amps to about 600 amps. The power source is then energized to result in the generation of a non-transferable plasma arc, which is capable of sustaining a plasma flame formed by the ignition of the primary and secondary gases. A carrier gas is provided to the plasma spray gun at a pressure and flow rate sufficient to fluidize and inject tantalum oxide powder at a feed rate in the range of about 20 gms/min to about 40 gms/min into the plasma flame. The tantalum oxide powder is then plasma sprayed onto the glow plug portion, forming and depositing the resultant tantalum oxide coating on the glow plug portion.

The present invention is particularly useful in making high corrosion and erosion resistant glow plugs having a long and useful service life.

BRIEF DESCRIPTION OF THE DRAWINGS

FIG. 1 is a graph showing the amount of wear in Samples 7–12, which are $Si_3N_4$ glow plugs without a $Ta_2O_5$ protective coating, after undergoing 212 hours of operation in a diesel engine.

FIG. 2 is a graph showing a comparison of the amount of wear in Samples 1–2, which are $Si_3N_4$ glow plugs with a $Ta_2O_5$ protective coating deposited by Low Temperature Arc Vapor Deposition (LTAVD), and Samples 3–6, which are $Si_3N_4$ glow plugs with a $Ta_2O_5$ protective coating deposited by Plasma Spray Deposition (PLASMA), according to the present invention, after undergoing 212 hours of operation in a diesel engine.

FIG. 3 is a graph showing a comparison of the amount of wear in Samples 1–2, which are $Si_3N_4$ glow plugs with a $Ta_2O_5$ protective coating deposited by Low Temperature Arc Vapor Deposition (LTAVD), and Samples 3–6, which are $Si_3N_4$ glow plugs with a $Ta_2O_5$ protective coating deposited by Plasma Spray Deposition (PLASMA), according to the present invention, after undergoing 500 hours of operation in a diesel engine.

BEST MODE FOR CARRYING OUT THE INVENTION

In the process of this invention, at least a portion of a ceramic glow plug is coated with tantalum oxide ($Ta_2O_5$) to protect the glow plug portion from the detrimental effects of corrosion and/or erosion resulting from the contact of the glow plug portion with the pressure, temperature and corrosive gases and liquids emitted when utilizing the glow plug in a diesel engine using alternative fuels.

Particularly, a silicon nitride ($Si_3N_4$) glow plug portion undergoes severe corrosion and erosion due in part to the presence of impurities such as sodium, calcium, magnesium and sulfur introduced by the fuel and the lubrication oil. In the process of this invention, the deposition of a uniformly continuous and adherent coating of tantalum oxide over the silicon nitride surface prevents these impurities from reacting with the silicon nitride surface. The uniformly continuous tantalum oxide coating, as deposited by the process of this invention, prevents these impurities from forming compounds such as $Na_2SO_4$ which have a lower melting temperature than silicon nitride and which are progressively eroded away by fuel and air spray, in the absence of such a coating.

By the use herein of the term "alternative fuels", it is meant fuels other than diesel fuel, for example, methanol, ethanol, natural gas, and mixtures thereof.

By the use herein of the term "uniform" to qualify the coating, it is meant that the thickness of the coating is essentially constant over the entire coated glow plug portion.

By the use herein of the term "continuous" to qualify the coating, it is meant that the coating covers the entire surface of the ceramic glow plug portion without any voids, thereby effectively sealing the glow plug portion against corrosion/erosion.

The material of the glow plug portion in the process of this invention is ceramic, such as for example, SiC, $Si_3N_4$, $Al_2O_3$, and more preferably, silicon nitride having a thermal expansion coefficient of about $3.0 \times 10^{-6} °C.^{-1}$.

The rotatable device can be of various construction sufficient for accommodating the glow plug portion. One such device is a collet having a variable speed control. Such equipment is well known in the art.

The plasma spray gun used in the process of this invention is manufactured by Metco, and is of the type "Metco 9MB", having a "GH" type nozzle, and a "#6" type powder port. A person of ordinary skill in the art can use suitable substitutes, as spray guns of this type are well known in the art.

To produce a uniform coating, the plasma spray gun may be held by a robot. The robot can be programmed to provide controlled positioning of the spray gun from the glow plug portion, to spray the glow plug portion with a protective coating of a preselected thickness. The robot parameters that can be controlled include: gun stand-off from the glow plug, gun traverse speed, raster path length, and the number of raster passes. Such robotics equipment is well known in the art.

In the procedural steps of the preferred embodiment of the process of this invention, the preselected glow plug portion desired to be coated with a corrosion inhibiting material is first cleaned. This cleaning can be accomplished by various methods and materials. Preferably, the glow plug portion is impacted with abrasive grit such as alumina, for a period of time sufficient for removing oxidized particles, dirt and other foreign material from the glow plug portion and thereafter contacting the glow plug with a solvent. The abrasive grit used can be $Al_2O_3$ or SiC, for example, and preferably $Al_2O_3$ of a fine mesh size, and the solvent cleaning can be by trichloroethane, methanol, and acetone, for example, and preferably, acetone.

After cleaning, the glow plug portion desired to be coated with a corrosion inhibiting material is etched. The etching is done for a period of time and at a temperature sufficient to obtain a surface roughness desirably, in the range of about 5 µm to about 9 µm and preferably, about 7.5 µm. A surface roughness less than 5 µm is undesirable because it can result in a detrimentally minimally adherent coating, which may crack or spall. A surface roughness greater than 9 µm is undesirable because it represents a waste of time and labor. Potassium hydroxide or other suitable alternatives may be used as the etching chemical. The etching is preferably accomplished by dipping the glow plug portion in molten potassium hydroxide for a period of time in the range of about 1 minute to about 3 minutes. A dipping time less than 1 minute is undesirable because the amount of etching, and the consequential surface roughness, would be below the required minimum surface roughness of about 5 µm. A dipping time greater than 3 minutes is undesirable because the amount of etching would be detrimentally excessive. The KOH is contained in a platinum crucible which is placed inside a furnace at a temperature desirably, in the range of 600° C. to 700° C., and preferably, at 650° C. A temperature less than 600° C. is undesirable because the etching rate would be undesirably low, which would represent a waste of time and labor. A temperature greater than 700° C. is undesirable because the amount of etching would be detrimentally excessive.

After etching, the glow plug is securely placed in a rotatable collet. The speed of the collet is desirably, in the range of about 300 rpm to about 400 rpm, and preferably, about 360 rpm. A speed less than 300 rpm is undesirable because the splattering of tantalum oxide would detrimentally occur. A speed greater than 400 rpm is undesirable because the tantalum oxide coating would have non-uniform thickness and continuity.

The glow plug portion to be coated which is placed in the collet, and the plasma spray gun, are positioned at relative positions adjacent one another. In the preferred embodiment, the glow plug portion and the plasma spray gun are positioned desirably, in the range of about 70 mm to about 110 mm from one another, and preferably, about 90 mm apart. Spacing less than about 70 mm is undesirable because splattering of tantalum oxide would detrimentally occur and spacing greater than about 110 mm is undesirable because the tantalum oxide deposition rate would be undesirably low, which would represent a waste of time and labor.

A primary gas is provided to the plasma spray gun. The primary gas can be either argon or nitrogen. In the preferred embodiment, the primary gas is argon and it is provided at a pressure sufficient to deliver the gas at a flow rate desirably within the range of about 60 $ft^3/hr$ to about 120 $ft^3/hr$, and preferably, at about 80 $ft^3/hr$. A flow rate less than about 60 $ft^3/hr$ is undesirable because it would result in too low a plasma flame. A flow rate greater than about 120 $ft^3/hr$ is undesirable because it would result in too high a plasma flame. To achieve flow rates within the ranges prescribed above, argon gas is provided at a pressure desirably within the range of about 70 psig to about 90 psig, and preferably, at about 80 psig.

A secondary gas is also provided to the plasma spray gun. The secondary gas can be either hydrogen or helium. In the preferred embodiment, the secondary gas is hydrogen and it is provided at a pressure sufficient to deliver the gas at a flow rate desirably within the range of about 5 $ft^3/hr$ to about 30 $ft^3/hr$, and preferably, at about 17 $ft^3/hr$. A flow rate less than about 5 $ft^3/hr$ is undesirable because it would be difficult to ignite the mixture of argon and hydrogen. A flow rate greater than about 30 $ft^3/hr$ is undesirable because it would result in too high a plasma flame. To achieve flow rates within the ranges prescribed above, hydrogen gas is provided at a pressure desirably within the range of about 70 psig to about 90 psig, and preferably, at about 80 psig.

The power source is then adjusted to deliver a current desirably in the range of about 400 amps to about 600 amps, and preferably, at about 500 amps. The power source is also adjusted to deliver voltage within the range of about 64 volts to about 65.5 volts. Current less than about 400 amps and voltage less than about 64 volts is undesirable because it would result in an insufficient arc to generate a desirable plasma flame. Current greater than about 600 amps and voltage greater than about 65.5 volts would be undesirable because there would be an excessive arc and simply be a waste of resources.

The power source is then energized to resultingly generate a non-transferable plasma arc capable of sustaining a plasma flame formed by the ignition of the mixture of argon and hydrogen.

A carrier gas is provided to the plasma spray gun. The carrier gas has tantalum oxide powder fluidized in it. In the preferred embodiment, the carrier gas is hydrogen and it is provided at a pressure and flow rate sufficient to fluidize and inject tantalum oxide powder at a powder feed rate desirably in the range of about 20 gms/minute to about 40 gms/minute into the plasma flame, and preferably, at about 30 gms/minute. A powder feed rate less than about 20 gms/minute is undesirable because it would result in a plasma flame being too lean in tantalum oxide, thus causing less coating to be deposited in a given time while also causing the glow plug to be overheated by the plasma flame. A feed rate greater than about 40 gms/minute is undesirable because it would result in too much tantalum oxide being injected into the plasma spray, detrimentally affecting the integrity of the coating. To achieve the injection of tantalum oxide in the desired feed rates, the carrier gas is delivered at a flow rate desirably within the range of about 12 ft$^3$/hr to about 17 ft$^3$/hr, and preferably, at about 14 ft$^3$/hr. A flow rate less than about 12 ft$^3$/hr is undesirable because it would be insufficient to properly fluidize the tantalum oxide powder. A flow rate greater than about 17 ft$^3$/hr is undesirable because it would be unnecessary and represent a waste of time and labor.

The tantalum oxide is then plasma sprayed onto the ceramic glow plug portion, forming and depositing a resultant tantalum oxide coating on the glow plug portion. Preferably, the tantalum oxide is plasma sprayed onto the ceramic glow plug portion in an atmosphere comprising argon and hydrogen. Alternatively, the atmosphere could also be a mixture of argon, nitrogen, helium and hydrogen, or combinations thereof.

In the preferred embodiment, the tantalum oxide powder has a particle size desirably in the range of about 10 μm to about 40 μm, and preferably, about 25 μm. A particle size less than about 10 μm is undesirable because it would result in too dense a coating. A particle size greater than about 40 μm is undesirable because it would result in too coarse a coating.

In the preferred embodiment, the plasma spraying of tantalum oxide onto the ceramic glow plug portion is repeated for an amount of time sufficient to form and deposit a preselected thickness of resultant tantalum oxide coating on the glow plug portion. That preselected thickness of tantalum oxide coating is desirably in the range of about 1 μm to about 5 μm, and preferably, about 2 μm. Thickness less than about 1 μm is undesirable because the coating often will not completely seal the glow plug portion and thickness greater than about 5 μm is undesirable because the residual stress would be sufficiently high to cause failure of the coating.

EXAMPLE 1

On a $Si_3N_4$ glow plug, a $Ta_2O_5$ coating was deposited by two separate process. Glow plug samples 1–2 represent $Si_3N_4$ glow plugs having a $Ta_2O_5$ coating deposited by Low Temperature Arc Vapor Deposition (LTAVD), a chemical deposition process. Glow plug samples 3–6 represent $Si_3N_4$ glow plugs having a $Ta_2O_5$ coating deposited by Plasma Spray (PLASMA), according to the preferred embodiment of the present invention.

Samples 1–6 were mounted in an in-line six cylinder diesel engine and the engine was run continuously for a period of 212 hours upon which a comparison was made between the amount of wear in samples 1–2 and the amount of wear in samples 3–6. Then the engine was again run continuously until a period of 500 hours had elapsed after which a comparison was again made between the amount of wear in samples 1–2 and the amount of wear in samples 3–6.

The performance of samples 1–2 and samples 3–6 was then compared with $Si_3N_4$ glow plug samples 7–12 after 212 hours of engine testing. Samples 7–12 represent $Si_3N_4$ glow plugs which did not have a $Ta_2O_5$ protective coating at all.

Samples 1–2 and samples 3–6 were prepared using the same $Ta_2O_5$ powder and had substantially the same coating thickness.

Samples 3–6 were prepared in the following manner according to the present invention: a $Si_3N_4$ glow plug portion desired to be coated with $Ta_2O_5$ was cleaned by impacting with abrasive $Al_2O_3$ grit having a mesh size of about 50 μm for about 2 minutes, for removing oxidation, dirt and other foreign materials. Then the glow plug was cleaned with acetone.

After cleaning, the $Si_3N_4$ glow plug portion desired to be coated with $Ta_2O_5$ was etched by dipping the glow plug portion in molten KOH for about 2 minutes. The molten KOH was contained in a platinum crucible placed inside a furnace at a temperature of about 650° C. The etching was sufficient to obtain a surface roughness of about 7.6 μm. Upon etching, the $Si_3N_4$ glow plug portion was first rinsed in distilled water and then in acetone. The etched $Si_3N_4$ glow plug portion was then inspected under an optical microscope and the surface finish was examined to ensure that the etched portion had at least a 5 μm surface roughness needed to produce an adherent coating of $Ta_2O_5$. To prevent over spray from adhering to the metal ferrule of the glow plug, the metal ferrule was masked with "Nicrobraz" green stop off, a masking material produced by Wall Comonoy Corp.

After etching, the $Si_3N_4$ glow plug was placed in a collet rotating at about 360 rpm and a Metco 9MB plasma spray gun having a type GH nozzle and a #6 powder port, held by a robot arm, was positioned about 90 mm apart from the glow plug portion.

Argon (Ar) and hydrogen ($H_2$) gases were provided to the plasma spray gun at a flow rates of about 80 ft$^3$/hr and about 17 ft$^3$/hr respectively and at a pressure of about 80 psig each.

A power source was adjusted to deliver a current at about 400 amps and a voltage of about 65 volts. The power source was then energized, resulting in a plasma flame formed by the ignition of Ar and $H_2$.

$H_2$ carrier gas was provided to the plasma spray gun at a flow rate of about 14 ft$^3$/hr to fluidize and inject $Ta^2O_5$ powder having a grit size in the range of about 10 μm to about 40 μm, at a powder feed rate of about 30 gms/minute. Then $Ta_2O_5$ was plasma sprayed onto the $Si_3N_4$ glow plug portion, resultingly forming and depositing a $Ta_2O_5$ coating having a thickness of about 2 μm on the $Si_3N_4$ glow plug portion.

The coated glow plug was placed on a test bench and energized with a power supply source at 24 volts (applied at a rate of 1 volt/minute) for a period of 24 hours, during which time the cooling air blowing across the glow plug tip was cycled "on/off" at 1 minute intervals. The cooling air reduced the surface temperature of the glow plug by about 300° C. during its "on" cycle and thus provided a thermal shock to test the coating quality.

All of the glow plug samples 1–2 and 3–6 were inspected under an optical microscope to ensure that there were no cracks in the coating, prior to installation in the diesel engine.

After the glow plugs were removed from the engine at 212 and 500 hour intervals, the external dimensions of the glow plugs were measured. The glow plug was deemed to have failed if its external dimensions decreased by 1 mm or more. Table A shows the results for samples 1–2 (LTAVD process) after 212 and 500 hours; Table B shows the results for samples 3–6 (PLASMA process) after 212 and 500 hours; and table C shows the results for samples 7–12 (uncoated plugs) after 212 hours in a diesel engine.

TABLE A

| | Decrease in Glow Plug Dimensions (mm) | |
|---|---|---|
| Samples No. | 212 hrs | 500 hrs |
| 1 | 0.36 | 0.95 |
| 2 | 0.68 | 1.28 |

TABLE B

| | Decrease in Glow Plug Dimensions (mm) | |
|---|---|---|
| Samples No. | 212 hrs | 500 hrs |
| 3 | 0.01 | 0.01 |
| 4 | 0.29 | 0.50 |
| 5 | 0.01 | 0.54 |
| 6 | 0.03 | 0.03 |

TABLE C

| | Decrease in Glow Plug Dimensions (mm) |
|---|---|
| Samples No. | 212 hrs |
| 7 | 0.40 |
| 8 | 0.33 |
| 9 | 0.58 |
| 10 | 0.59 |
| 11 | 0.47 |
| 12 | 0.79 |

It can be seen that the $Si_3N_4$ glow plugs coated with $Ta_2O_5$ by PLASMA process (samples 3–6) exhibit the least reduction in the external dimensions, as compared with samples 1–2. The uniformity and adherence of the $Ta_2O_5$ coating deposited by the process of the present invention is so good that even after 500 hours of rigorous testing in a diesel engine, samples 3–6 exhibited significantly lower wear than samples 1–2.

INDUSTRIAL APPLICABILITY

The plasm spray process of this invention is particularly useful for coating the silicon nitride portion of a glow plug with a tantalum oxide coating having excellent adherence and uniform continuity on the glow plug portion. This protective coating increases the corrosion and erosion resistance of the glow plug and enhances its useful service life.

Other aspects, objects and advantages of this invention can be obtained from a study of the drawings, the disclosure and the appended claims.

We claim:

1. A process for coating at least a portion of a ceramic glow plug with a corrosion inhibiting material, comprising the steps of:
   cleaning and etching a portion of the glow plug;
   placing the glow plug on a rotatable device;
   positioning the glow plug portion to be coated and a plasma spray gun at relative positions adjacent one another;
   providing a primary gas to said plasma spray gun at a pressure sufficient to deliver said primary gas at a flow rate in the range of about 60 ft³/hr to about 120 ft³/hr;
   providing a secondary gas to said plasma spray gun at a pressure sufficient to deliver said secondary gas at a flow rate in the range of about 5 ft³/hr to about 30 ft³/hr;
   adjusting a power source to deliver current in the range of about 400 amps to about 600 amps;
   energizing said power source and resultingly generating a non-transferable plasma arc capable of sustaining a plasma flame formed by the ignition of said primary and secondary gases;
   providing a carrier gas to said plasma spray gun at a pressure and flow rate sufficient for fluidizing and injecting tantalum oxide powder at a feed rate in the range of about 20 gms/min to about 40 gms/min into said plasma flame;
   plasma spraying said tantalum oxide onto the ceramic glow plug portion, and forming and depositing resultant tantalum oxide coating on said glow plug portion.

2. A process, as set forth in claim 1, wherein said ceramic glow plug is a silicon nitride glow plug.

3. A process, as set forth in claim 1, including:
   repeating the plasma spraying for an amount of time sufficient to deposit a selected thickness of tantalum oxide coating on said glow plug portion.

4. A process, as set forth in claim 3, wherein the selected thickness of tantalum oxide coating is in the range of about 1 μm to about 5 μm.

5. A process, as set forth in claim 4, wherein the selected thickness of tantalum oxide coating is about 2 μm.

6. A process, as set forth in claim 1, including cleaning the ceramic glow plug portion by impacting the glow plug portion with an abrasive grit.

7. A process, as set forth in claim 6, wherein the abrasive grit is one of $Al_2O_3$, SiC and mixtures thereof.

8. A process, as set forth in claim 6, including contacting the glow plug portion with a solvent after said glow plug is impacted with abrasive grit.

9. A process, as set forth in claim 8, wherein said solvent is one of trichloroethane, methanol, acetone and mixtures thereof.

10. A process, as set forth in claim 1, including etching the glow plug portion in molten potassium hydroxide at a temperature of about 650° C. for a period of time sufficient to attain a surface roughness in the range of about 5 μm to about 9 μm.

11. A process, as set forth in claim 10, wherein the step of etching the glow plug portion in molten potassium hydroxide at a temperature of about 650° C. is carried out for a period of time in the range of about 1 minute to about 3 minutes.

12. A process, as set forth in claim 1, including rotating said rotatable device at a speed in the range of about 300 rpm to about 400 rpm.

13. A process, as set forth in claim 1, including positioning said glow plug portion at a distance in the range of about 70 mm to about 110 mm from said plasma spray gun.

14. A process, as set forth in claim 13, including positioning said glow plug portion at a distance of about 90 mm from said plasma spray gun.

15. A process, as set forth in claim 1, including providing said primary gas to said plasma spray gun at a pressure in the range of about 70 psig to about 90 psig.

16. A process, as set forth in claim 1, wherein said primary gas is argon.

17. A process, as set forth in claim 1, including providing said secondary gas to said plasma spray gun at a pressure in the range of about 70 psig to about 90 psig.

18. A process, as set forth in claim 1, wherein said secondary gas is hydrogen.

19. A process, as set forth in claim 1, including adjusting said power source to deliver arc voltage in the range of about 64 volts to about 66 volts.

20. A process, as set forth in claim 1, including providing said carrier gas at a flow rate in the range of about 12 $ft^3$/hr to about 17 $ft^3$/hr.

21. A process, as set forth in claim 1, wherein said carrier gas is hydrogen.

22. A process, as set forth in claim 1, including plasma spraying of said tantalum oxide powder in an atmosphere comprising argon and hydrogen.

23. A process, as set forth in claim 1, wherein said tantalum oxide powder has a particle size in the range of about 10 μm to about 40 μm.

* * * * *